Figure 1:
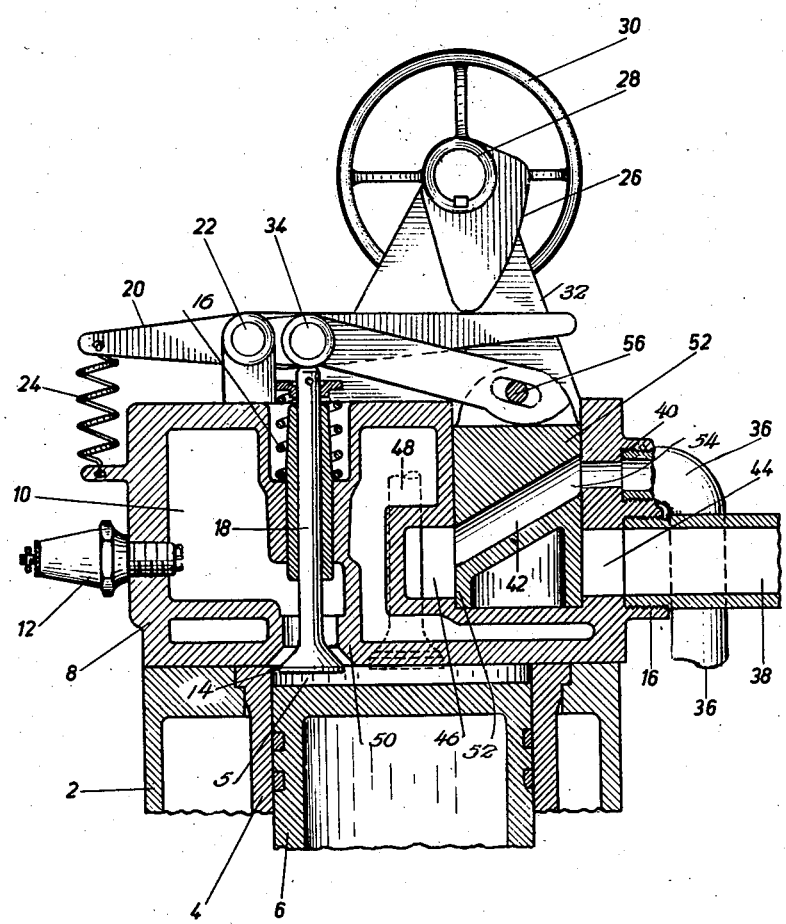

July 21, 1942. W. LEHMANN 2,290,646
STARTING APPARATUS FOR DIESEL ENGINES
Filed June 25, 1940 2 Sheets-Sheet 2

Inventor:
WILLY LEHMANN,
BY Bailey & Larson
ATTORNEYS

Patented July 21, 1942

2,290,646

UNITED STATES PATENT OFFICE 2,290,646

STARTING APPARATUS FOR DIESEL ENGINES

Willy Lehmann, Cottbus, Germany, assignor to "Famo" Fahrzeug-und-Motorenwerke, G. m. b. H., Breslau, Germany, a corporation of Germany Application June 25, 1940, Serial No. 342,397
In Germany June 23, 1939

6 Claims. (Cl. 123—32)

This invention is directed to a starting apparatus for an internal combustion engine of the Diesel type. More particularly the invention is directed to a starting mechanism in which the Diesel engine is started as an ordinary gasoline internal combustion engine, and after starting, switched over to operation on relatively heavy fuel oil.

In one well-known construction for starting Diesel engines, a cylinder head is provided which includes an auxiliary combustion chamber which cooperates with the main combustion chamber in receiving an air-fuel mixture, the fuel being one of the lighter petroleum products such as gasoline or benzene, and an ignition device such as a spark plug by means of which the Diesel engine is started as an ordinary gasoline engine. After the engine has been started and brought up to a desired speed, the auxiliary combustion chamber is closed off, and relatively heavy fuel oil injected into the main combustion chamber whereby the engine operates according to the conventional Diesel engine. In this known construction, separate conduits for the gasoline-air mixture used for starting, and the air supply for the Diesel operation, have been joined externally of the cylinder head and then connected to a bore in the cylinder head leading to the combustion chamber. Each conduit is fitted with a valve, and the two valves are interconnected so that when one conduit is open the other conduit becomes automatically closed.

Difficulties arise in the operation of the engine after the engine has been accelerated as a gasoline engine to the speed necessary for Diesel operation, and the engine is beginning to operate as a Diesel engine. Difficulty of igniting the Diesel fuel charge is encountered, and it has been discovered that this difficulty is due to the fact that gasoline or benzene used for the starting of the engine has precipitated in the relatively long passageway between the outside of the cylinder head and the inlet to the combustion chamber, and this condensed gasoline is carried along into the engine with the air supply for the Diesel operation. Hitherto known attempts to secure proper ignition of the heavy fuel oil at the moment the engine is changed from gasoline to Diesel operation have not been successful.

It is an object of this invention to provide a structure in which the engine can be smoothly operated as a Diesel engine immediately after being changed from gasoline to Diesel operation.

Another object of the invention is to provide a Diesel engine structure in which the presence of light fuel products used for starting the engine is substantially eliminated from the air supply duct to the engine for Diesel operation.

A further object of the invention is to provide a cylinder head construction for a Diesel engine which includes an auxiliary combustion chamber for starting purposes, which head is light and compact in structure, and includes means for maintaining the effective length of the bore, through which both the gasoline-air mixture for starting and the air used for running the Diesel engine are carried, as small as possible.

Another object of the invention is to construct a passageway in a cylinder head for a Diesel engine adapted to be started as a gasoline engine, so that a substantial part of the passageway in the head is composed of two passageways in a valve which has a simple and readily accessible construction.

Generally these objects of the invention are obtained by including in the passageway within the cylinder head through which the gasoline-air mixture used for starting and the air used for running Diesel engine, are both carried, a slide valve which in itself alternately forms substantially the whole of the passageway either for the air or for the gasoline-air fuel mixture. Accordingly, the fixed bore of the prior art is in essence substantially replaced by one passageway for the gas-oil mixture and a second passageway for the air alone. In this way when the valve is moved to supply air alone to the Diesel engine, the air does not pass through a passageway in which drops of gasoline have collected. Therefore, no difficulty is encountered in the operation of the Diesel engine on relatively heavy fuel immediately after the gasoline operation of the engine has been stopped. The slide valve is joined to a valve providing an opening into the auxiliary combustion chamber so that when the auxiliary chamber is opened into the main combustion chamber, the slide valve is automatically positioned to feed gasoline-air fuel to the combustion chamber, while when the auxiliary combustion chamber is cut off, the slide valve is automatically moved to supply air alone to the combustion chamber.

Figure 2:
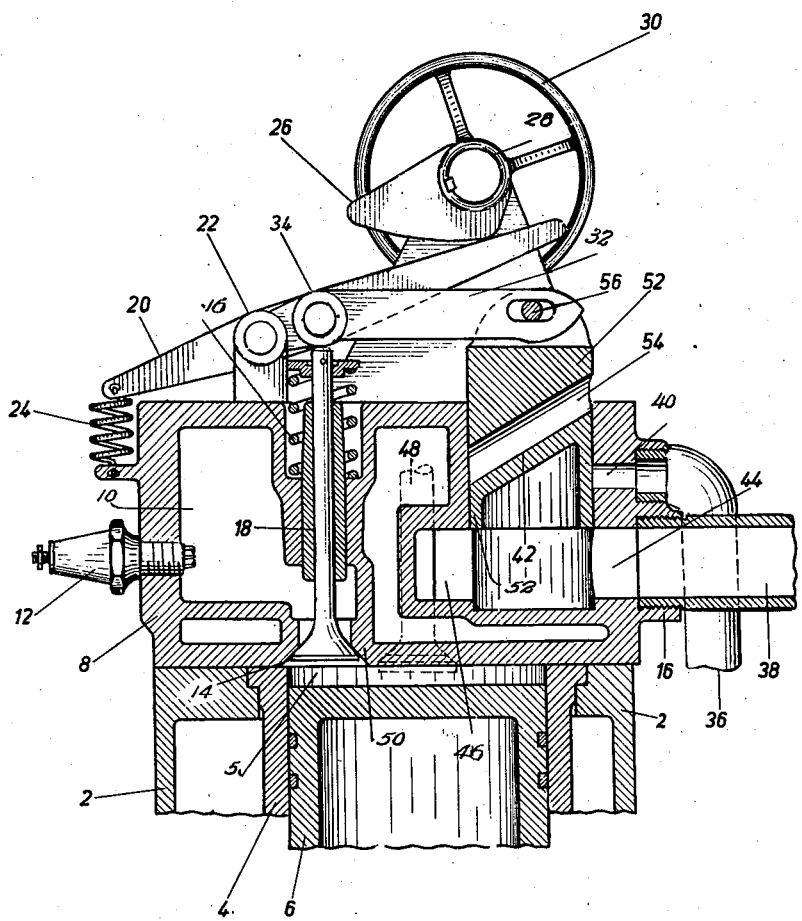

The means by which the objects of the invention are obtained are more fully disclosed with reference to the accompanying drawings in which Fig. 1 is a cross-sectional view of the head of a Diesel engine disclosing the novel construction of this invention, and Fig. 2 is a similar view but showing the elements in a different operating position.

In both Figs. 1 and 2 similar reference characters refer to similar parts. The engine block 2 contains the usual cylinder lining 4 in which a piston 6 operates. The portion 5 of the cylinder above piston 6 constitutes the main combustion chamber. The cylinder head 8 is provided with an auxiliary combustion chamber 10 into which a spark plug 12 projects, it being understood that this chamber functions in the manner of an Otto engine, as an auxiliary combustion chamber for purposes of starting the Diesel engine. Chamber 10 communicates with main combustion chamber 5 through a valve 14 normally urged into seated position by spring 16 connected to valve stem 18. In Fig. 1 the valve is shown held in open unseated position so that auxiliary chamber 10 communicates with main combustion chamber 5 for starting purposes.

To establish such communication, a rocker arm 20 is mounted on a shaft 22 journaled externally upon the cylinder head 8. One end of this arm is urged downwardly by spring 24, while the other end of the arm is movable by cam 26 mounted upon shaft 28 turnable by wheel 30.

A second arm 32 is fixed at one end to shaft 22 and turnable therewith. A roller 34 is joined to shaft 32 and contacts the end of stem 18 of valve 14. Consequently, turning of the wheel 30 causes a movement of arm 20 by reason of cam 26 and spring 24, and also a movement of arm 32. Movement of arm 32, of course, raises or lowers rollers 34 and thereby moves valve 14 into open or closed position.

Joined to head 8 are conduit 36 adapted to supply a light oil fuel such as gasoline- or benzene-air mixture to the engine for starting purposes, and a second conduit 38 adapted to supply air to the engine for the Diesel operation of the same on relatively heavy fuel oils. In prior known constructions these two conduits were connected externally of the cylinder head to a common bore which extended to the combustion chamber.

In this invention, conduit 36 communicates through port 40 to a cylinder 42. Conduit 38 also communicates with cylinder 42 through port 44. Cylinder 44 communicates through a relatively short passage 46 to a valve 48 through which entrance is made into main combustion chamber 5. Wall 50 separates the auxiliary combustion chamber 10 from this passageway 46.

Mounted within cylinder 42 is a gas-tight slide valve 52. In the construction shown this valve is provided with a bore 54 which is adapted in the position shown in Fig. 1 to establish communication between port 40 and passage 46. The length of valve 52 is such that when it is raised in the position shown in Fig. 2, communication between port 44 and passage 46 is established, while port 40 is closed off. The raising and lowering of valve 52 is accomplished simultaneously with the operation of valve 14, by employing a pin and slot connection 56 between the upper end of the valve and the end of arm 32.

It is clear that when the engine is to be started and run on a light fuel mixture such as gasoline, the wheel 30 is rotated to the position shown in Fig. 1 so that valve 14 is opened and the auxiliary chamber 10 becomes a part of combustion chamber 5 so that the engine can be operated as the ordinary gasoline internal combustion engine. In this position the valve 52 has been depressed so that gasoline-air mixture fed through conduit 46 enters into combustion chamber 5 through passage 46 and valve 48.

After the engine has been started, the wheel 30 is rotated to the position shown in Fig. 2 so that valve 14 is closed, thus closing off auxiliary chamber 10, while at the same time valve 52 is raised so that air is fed through conduit 38 and passage 46 into the combustion chamber. As bore 54 no longer forms a part of the passageway, any gasoline drops which have collected therein are not carried along by air passing through port 44 into the combustion engine, and consequently no difficulty is encountered in the initial operation of the engine on a relatively heavy fuel mixture. At the same time the apparatus is of light weight and simple structure, and easily accessible for purposes of adjustment and repair.

Having now described a means by which the objects of the invention are obtained, I claim:

1. In a Diesel type engine having an auxiliary ignition starting system, the improvement comprising an inlet valve in the cylinder head of said engine, a passageway in said cylinder head communicating with said inlet valve, an air duct for Diesel operation of said engine in said cylinder head, a fuel-air duct for starting operation of said engine in said cylinder head, and a second valve movably mounted in said cylinder head for selectively placing either said air duct or said fuel-air duct into communication with said passageway, said second valve being disposed adjacent said inlet valve so that said passageway which is adapted to conduct both the air and the fuel-air mixture is so short only unharmful quantities of fuel from said fuel-air mixture can precipitate therein.

2. In a Diesel type engine as in claim 1, said second valve comprising a piston valve including separated passageways for said air and said air-fuel mixture, respectively.

3. In a Diesel type engine as in claim 1, said second valve comprising a piston, a bore extending through said piston, and means for moving said piston so that said bore provides communication between said fuel-air duct and said passageway while said piston closes communication between said air duct and said passageway.

4. In a Diesel type engine as in claim 1, an auxiliary combustion chamber, a cut-off valve between said auxiliary chamber and the main combustion chamber of said engine, and means for simultaneously actuating said second valve and said cut-off valve to open said cut-off valve and place said air duct in communication with said passageway.

5. In a Diesel type engine having an auxiliary ignition starting system, an intake valve for the main combustion chamber of said engine, a passageway in the cylinder head of said engine extending from an air port to said valve, a cylinder intersecting said passageway adjacent said intake valve so as to leave a very short passage between said cylinder and said intake valve, an air-fuel port in said cylinder, and a piston valve having a bore therethrough movably mounted in said cylinder to open said passageway and close said air-fuel port in one position and to place said air-fuel port into communication with said short passage through said bore while closing said passageway to said air port when in another position whereby both air and air-fuel mixture have a common path through said cylinder head only through said short passage adjacent said intake valve.

6. In a Diesel type engine as in claim 5, means for actuating said intake valve both for the air-fuel starting and the air only for normal operation of said engine.

WILLY LEHMANN.